(12) United States Patent
Miesner

(10) Patent No.: US 12,149,142 B1
(45) Date of Patent: Nov. 19, 2024

(54) LINEAR ELECTROMAGNETIC ACTUATOR WITH IMPROVED COIL COOLING

(71) Applicant: The United States of America, as represented by the Secretary of the Navy, Arlington, VA (US)

(72) Inventor: John E. Miesner, Fairfax, VA (US)

(73) Assignee: The United States of America, represented by the Secretary of the Navy, Washington, DC (US)

( * ) Notice: Subject to any disclaimer, the term of this patent is extended or adjusted under 35 U.S.C. 154(b) by 197 days.

(21) Appl. No.: 17/684,967

(22) Filed: Mar. 2, 2022

(51) Int. Cl.
*H02K 33/06* (2006.01)
*H02K 3/24* (2006.01)
*H02K 33/16* (2006.01)

(52) U.S. Cl.
CPC .............. *H02K 33/16* (2013.01); *H02K 3/24* (2013.01); *H02K 33/06* (2013.01)

(58) Field of Classification Search
CPC ....................................................... H02K 3/24
See application file for complete search history.

(56) References Cited

U.S. PATENT DOCUMENTS

| | | | |
|---|---|---|---|
| 8,937,411 B2* | 1/2015 | Kim ....................... | H02K 33/02 310/15 |
| 9,390,875 B2* | 7/2016 | Kohlhafer ................. | H01F 7/13 |
| 10,848,044 B1* | 11/2020 | Miesner ................ | H02K 33/06 |
| 11,239,736 B1 | 2/2022 | Miesner | |
| 2012/0175974 A1* | 7/2012 | Robertson ............. | H01F 7/1646 310/12.26 |
| 2013/0328649 A1* | 12/2013 | Robertson ................. | H01F 7/08 335/234 |

* cited by examiner

*Primary Examiner* — Tran N Nguyen
*Assistant Examiner* — Masoud Vaziri
(74) *Attorney, Agent, or Firm* — Dawn C. Russell; Jesus J. Hernandez

(57) ABSTRACT

Electromagnetic inertial force generators are provided, which include radially polarized permanent magnets providing bias flux across axial gaps to combine with axial coil flux to linearize the actuator output. Coil cooling in the electromagnetic inertial force generators is improved by embedding the coils in the stationary portion of the actuator, allowing for direct transfer of coil heat, and reducing oscillating stresses on coil leads.

19 Claims, 10 Drawing Sheets

LINEAR ELECTROMAGNETIC ACTUATOR WITH IMPROVED COIL COOLING

FIELD OF THE INVENTION

Electromagnetic inertial force generators are provided, which include radially polarized permanent magnets providing bias flux across axial gaps to combine with axial coil flux to linearize the actuator output. Coil cooling in the electromagnetic inertial force generators is improved by embedding the coils in the stationary portion of the actuator, allowing for direct transfer of coil heat.

BACKGROUND OF THE INVENTION

Permanent magnets may be used to linearize the response of an electromagnetic actuator.

For example, U.S. Pat. Nos. 10,848,044 and 11,239,736, both issued to Miesner, use radial permanent magnets between inner and outer flux cylinders to provide magnetic bias across two axial air gaps and uses a current conducting coil to drive magnetic flux across the same axial air gaps. The magnetic bias flux is in opposite directions across the two air gaps while the coil flux across the two gaps is in the same direction. The combination of bias flux and coil flux cancels in one gap and adds in the other gap producing a net force on an inertial mass and an equal and opposite force on the supporting structure. The resulting force is linear with current through the drive coil.

The electromagnetic actuators of Miesner provide compact, reliable, and efficient devices. However, the current conducting coils are thermally isolated by the axial air gaps, which prevents effective heat transfer. This limits the power input and requires relatively large coils to lower the electrical resistance. It also reduces the reliability of the devices, because the coil leads must connect between the moving and stationary portions of the actuator and therefore are subject to oscillating stresses.

Accordingly, a need exists in the art for electromagnetic inertial force generators that provide improved heat transfer and increased reliability.

SUMMARY OF THE INVENTION

The apparatus and methods of the invention address the need for linear electromagnetic actuators with improved heat transfer by providing electromagnetic inertial force generators that include radially polarized permanent magnets, providing bias flux across axial gaps to combine with axial coil flux to linearize the actuator output. Coil cooling in the electromagnetic inertial force generators is improved by embedding the coils in the stationary portion of the actuator, allowing for direct transfer of coil heat, and reduced oscillating stresses on coil leads.

One aspect of the invention provides linear electrodynamic actuator, which includes a top stationary flux return; a top drive coil embedded in the top stationary flux return; a bottom stationary flux return; a bottom drive coil embedded in the bottom stationary flux return; a stationary shaft, with a top side and a bottom side, that connects the top stationary flux return to the bottom stationary flux return; a linear bearing provided on the stationary shaft; and a movable inertial mass slidably mounted by the linear bearing to the stationary shaft, between the top stationary flux return and the bottom stationary flux return. A top air gap separates the top stationary flux return from the movable inertial mass, and a bottom air gap separates the bottom stationary flux return from the movable inertial mass. The movable inertial mass includes an inner flux conductor; an outer flux conductor; and polarized permanent magnets provided between and in contact with the inner flux conductor and the outer flux conductor. A first spring is provided between the top stationary flux return and the inner flux conductor, and a second spring is provided between the bottom stationary flux return and the inner flux conductor.

Other features and advantages of the present invention will become apparent to those skilled in the art upon examination of the following or upon learning by practice of the invention.

DETAILED DESCRIPTION OF THE INVENTION

Figure 1:
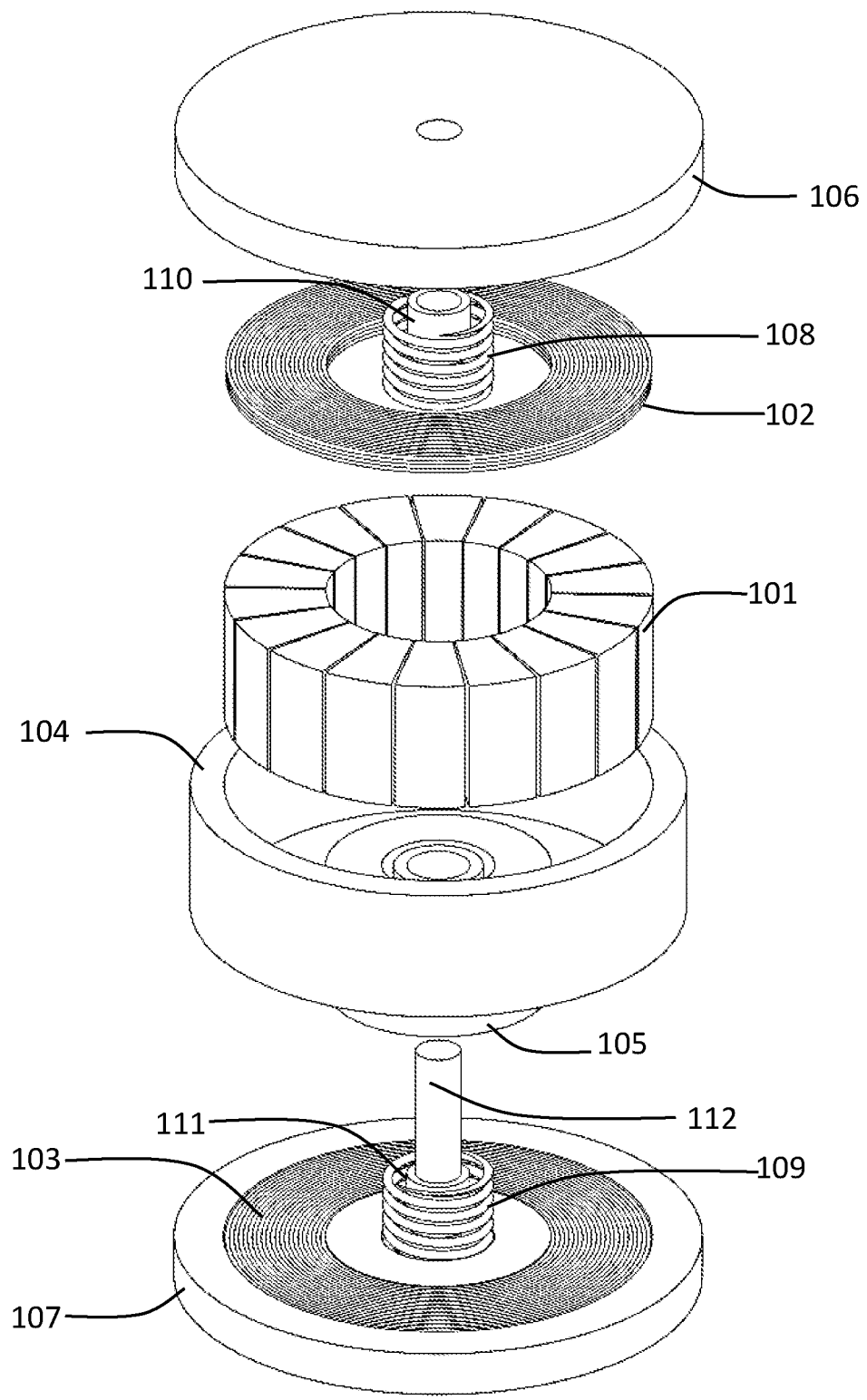
FIG. 1 is an exploded view of a linear electromagnetic actuator with improved coil cooling, according to one embodiment of the present invention.

The invention described herein provides electromagnetic inertial force generators, in which radially polarized permanent magnets provide bias flux across axial gaps to combine with axial coil flux to linearize the actuator output. Coil cooling is improved by embedding the coils in the stationary portion of the actuator, allowing for direct transfer of coil heat, and reduced oscillating stresses on coil leads.

The linear electromagnetic actuators beneficially exhibit improved force output because the current conducting coils are embedded in the stationary portion of the actuator, increasing the heat transfer (coil heat is directly transferred to steel, which has a much higher thermal conductivity than air), and allowing a smaller coil operating at a higher power. Reliability is also improved because the coil leads are not subject to oscillating stresses.

The linear electromagnetic actuators of the invention provide a polarized permanent magnets between and in contact with an inner flux conductor and an outer flux conductor. The polarized permanent magnets and flux conductors are joined, and move as a unit forming the moveable inertial mass of the actuator. The inertial mass is supported by one or more bearings (in some preferred embodiments of the invention, two bearings are used, with one bearing provided above the inertial mass and the other bearing provided below the inertial mass), in addition to two sets of springs. The configuration of bearings and springs permits the movable inertial mass to move axially with respect to top and bottom stationary flux returns and the support structure connecting them.

There are top and bottom air gaps between the moving inertial mass and the stationary flux returns, which accommodate axial motion. A drive coil is embedded in each of the stationary flux returns and is aligned with the permanent magnet ring. The two drive coils can be electrically connected, either in series or in parallel, such that the direction of current flow is the same in each coil.

Magnetic flux from the magnet ring passes through the outer flux conductor, across the air gaps, through the stationary flux returns, back across the air gaps, and through the inner flux conductor back to the magnet to complete a flux loop. The magnetic flux passing across the air gaps provides a bias for the actuator. The bias flux is in opposite directions across the two air gaps.

Magnetic flux from the drive coils passes from the inner flux conductor across the top or bottom gap, through the top or bottom stationary flux returns, back across the gap to the outer flux conductor, across the opposite gap and through the opposite stationary flux return, and then back to the inner flux conductor to complete a flux loop. The magnetic flux from the top and bottom drive coils is in the same direction across the two air gaps.

The combination of bias flux and coil flux cancels in one gap and adds in the other gap because the bias flux is in opposite directions across the gaps while the coil flux is in the same direction across the gaps. Thus, there is a net force on the inertial mass and an equal and opposite force on the returns. The resulting force is linear with current through the drive coil and will be in the opposite direction when the current through drive coils is reversed.

The invention includes a magnet assembly that moves relative to upper and lower coil assemblies as allowed by axial gaps between the assemblies. The magnet assembly may be configured with a single magnet, or an array of multiple magnetic elements arranged as an annular ring, a rectangle, or any other desired geometric configuration (triangle, pentagon, hexagon, etc.). The magnet assembly is slidably mounted by linear bearings to stationary shafts that connect the upper and lower coil assemblies. Springs between the magnet assembly and the upper and lower coil assemblies provide a restoring and centering force. Movement of the magnet assembly generates axial inertial forces.

The magnet assembly includes an inner flux conductor surrounded by an outer flux conductor. Radially polarized permanent magnets are between and in contact with the inner and outer flux conductors. The coil assemblies each include a wound coil embedded in a coil holder plate. Each coil corresponds to and is aligned with an inner flux conductor.

The radially polarized permanent magnets provide bias flux across the axial gaps to combine with the coil flux and linearize the actuator output. Permanent magnet flux flows from a permanent magnet into an inner flux conductor, across the lower gap or upper gap, through the coil holder plate, back across the lower gap or upper gap to the outer flux conductor, and then back to the permanent magnet in a closed loop. Coil current flux flows around the two coils in a complete loop from the lower coil holder plate, across the lower gap, through the movable inner flux conductor, across the upper gap, through the upper coil holder plate, back across the upper gap, through the movable outer flux conductor, and back across the lower gap to the lower coil holder plate.

Permanent magnet flux and coil current flux are in the same direction and add in the lower gap while they are in opposite directions and tend to cancel in the upper gap. Thus, there is a net downward magnetic force on the magnet assembly causing the assembly to move and generate inertial forces that are linear with current through the drive coils. When current through the drive coils is reversed, the direction of coil current flux also reverses and the combination of permanent magnet flux and coil flux cancels in the lower gap and adds in the upper gap producing a net upward force on the magnet assembly. Thus, inertial forces generated are both linear and reversible.

Different numbers and arrangements of radial magnet components and drive coils are envisioned in accordance with the invention, as long as the magnetic flux across the two gaps from the magnet ring or rings is in opposite directions across the gaps and the flux from the drive coil or coils is in the same direction across the two gaps. For example, the magnets may be arranged into an annular configuration, with the drive coils wound into a corresponding annular shape, as shown, for example, in FIGS. 1-6. Alternatively, the magnets may have straight sides and be arranged as a polygon, such as rectangular magnets formed into a square. The drive coils would then be wound into a corresponding shape, as shown, for example, in FIGS. 7-10.

The invention will now be described by reference to the drawings.

Figure 2:
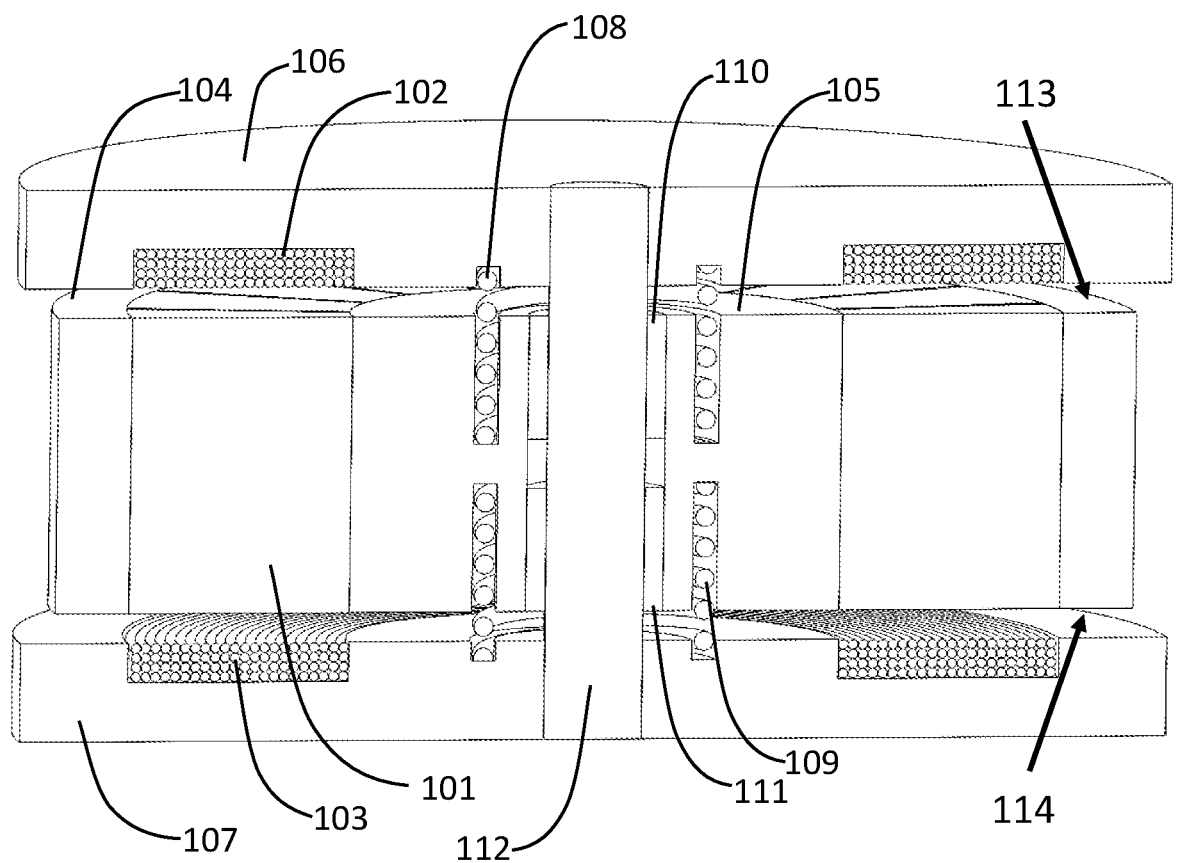
FIG. 2 is a cross sectional view of the linear electromagnetic actuator of FIG. 1.

FIG. 1 and FIG. 2 show two views of a first embodiment of the linear electromagnetic actuator of the present invention. The actuator has a radially polarized permanent magnet ring (101) between and in contact with inner flux cylinder (105) and outer flux cylinder (104). Radially polarized permanent magnet ring (101), inner flux cylinder (105), and outer flux cylinder (104), are joined and move as a unit forming the moveable inertial mass of the actuator. A top stationary flux return (106) and a bottom stationary bottom flux return (107) are separated from the conglomerate inertial mass by top air gap (113) and bottom air gap (114) (see FIG. 2). The inertial mass is slidably mounted by top linear bearing (110) and bottom linear bearing (111) to stationary shaft (112), which connects the top stationary flux return (106) and the bottom stationary flux return (107). Spring (108) is in contact with the top stationary flux return (106), and spring (109) is in contact with the bottom stationary flux return (107), providing a restoring force to the inertial mass positioned between them. Bottom drive coil (103) is embedded in bottom stationary flux return (107) and top drive coil (102) is embedded in top stationary flux return (106).

The radially polarized magnet ring (101) is preferably composed of a radial array of high strength magnet segments, such as Neodymium magnets, preferably Neodymium Iron Boron (NdFeB) magnets. The outer flux cylinder (104) and inner flux cylinder (105) and top stationary flux return (106) and bottom stationary flux returns (107) are preferably made of silicon steel to provide high permeability and low hysteresis. These components may also be composed of thin laminations to reduce eddy currents. The top spring (108) and bottom spring (109) and the shaft (112) are preferably made of nonferrous material to prevent a flux path bypassing gap (113) and gap (114). Linear bearings (110, 111) are preferably low friction linear ball bearings to prevent inertial force distortion due to friction, though in some aspects of the invention, a single linear bearing may be used to mount the inertial mass on the stationary shaft. Top drive coil (102) and bottom drive coil (103) are preferably wound from insulated copper wire manufactured for coils, known as magnet wire.

Figure 3:
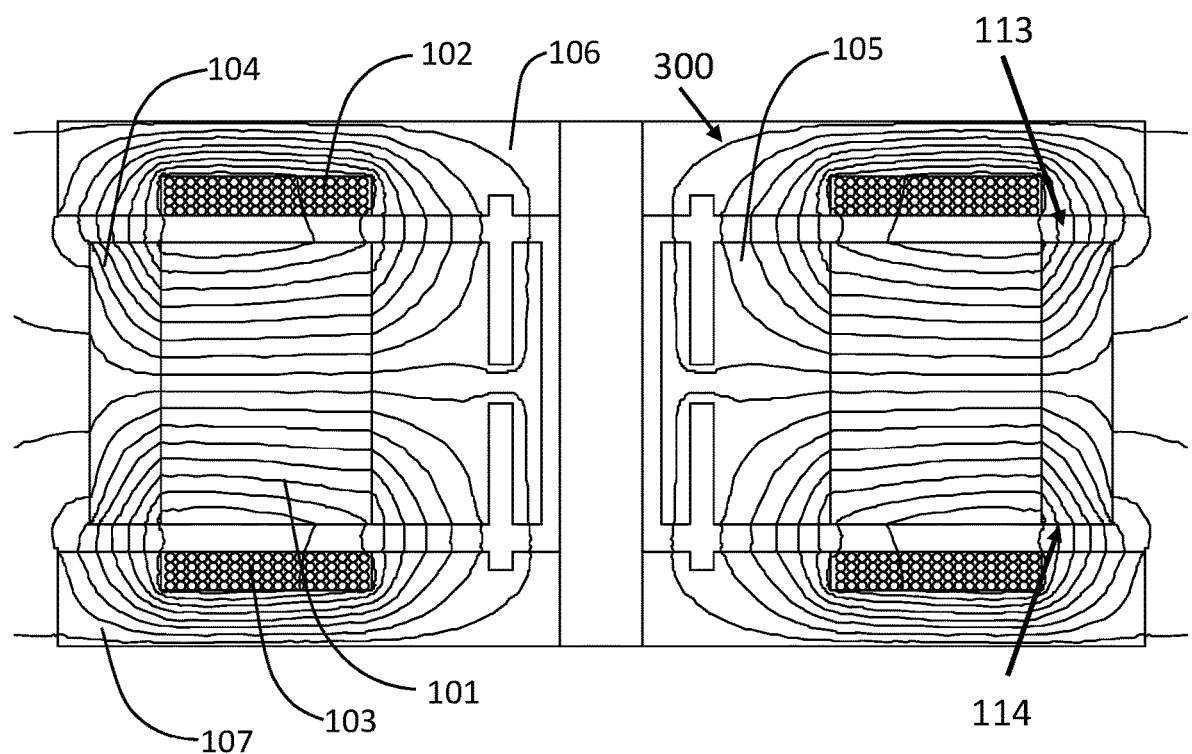
FIG. 3 shows the calculated magnetic flux lines from the permanent magnet ring only for the linear electromagnetic actuator of FIG. 1.

FIG. 3 shows the calculated magnetic flux lines (300) exclusively from permanent magnet ring (101) (i.e., no current through top drive coil (102) and bottom drive coil (103)) when the inertial mass is in the neutral position. A majority of the magnetic flux lines (300) pass from the permanent magnet ring (101) through outer flux cylinder (104), across gap (113) or gap (114), through the top and bottom stationary flux returns (106, 107), back across gap (113) or gap (114), and through inner flux cylinder (105) to complete a flux loop back to the magnet ring (101).

The magnetic flux passing across gap (113) and gap (114) is called the bias flux. The bias flux is in opposite directions across gap (113) and gap (114). For example, if the bias flux is upward between outer flux cylinder (104) and top flux return (106), then it is downward between outer flux cylinder (104) and bottom flux return (107). For this example, the bias flux is downward between inner flux cylinder (105) and top flux return (106) and upward between inner flux cylinder (105) and bottom flux return (107).

Figure 4:
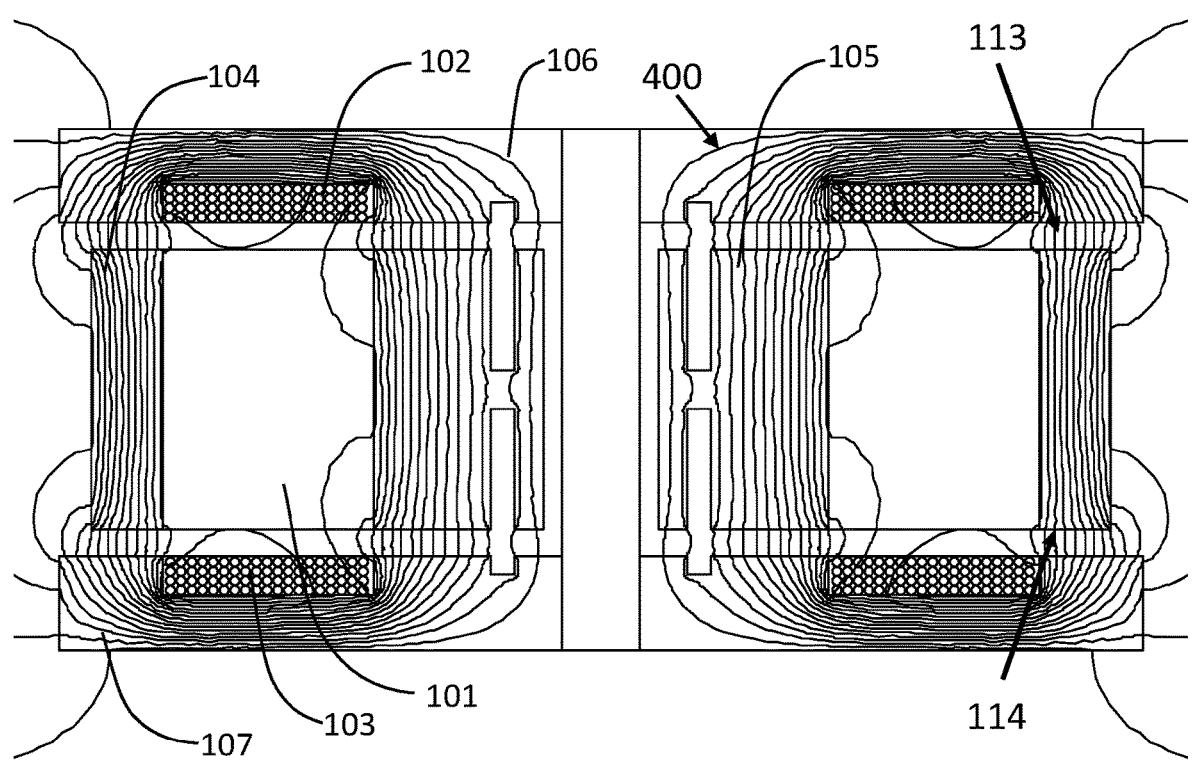
FIG. 4 shows the calculated magnetic flux lines from the top and bottom drive coils only for the linear electromagnetic actuator of FIG. 1.

FIG. 4 shows calculated magnetic flux lines (400) resulting from current through top drive coil (102) and bottom drive coil (103) only (i.e., no permanent magnet ring flux) when the inertial mass is in the neutral position. A majority of the magnetic flux lines (400) pass from inner flux cylinder (105) across gaps (113) or (114), through the top stationary flux return (106) or bottom stationary flux return (107), back across gap (113) or gap (114), to outer flux cylinder (104), across the opposite gap (113) or (114), through the opposite stationary flux return (106) or (107), and back to inner flux cylinder (105) to complete a flux loop.

The drive coil magnetic flux passing across gap (113) and gap (114) is in the same direction. That is, if the coil flux is upward between outer flux cylinder (104) and top flux return (106) then it is also upward between outer flux cylinder (104) and bottom flux return (107). For this example, the coil flux is downward between inner flux cylinder (105) and top flux return (106) and also downward between inner flux cylinder (105) and bottom flux return (107).

Figure 5:
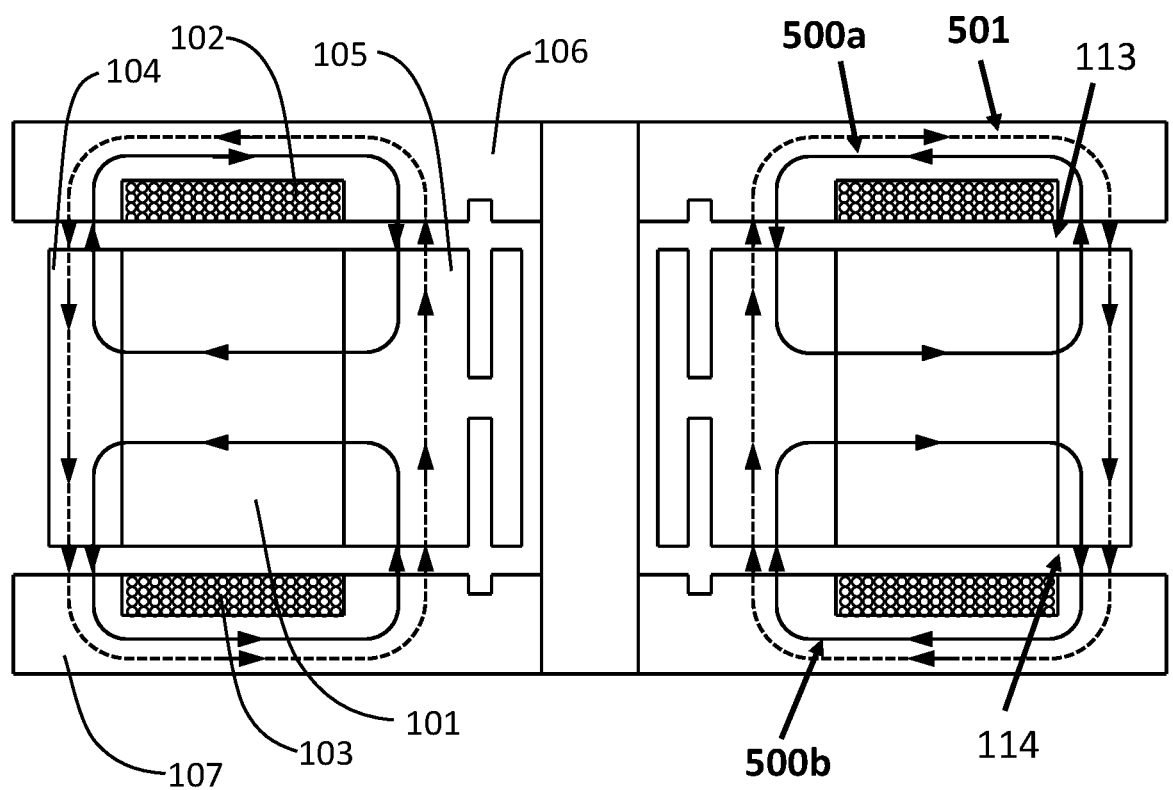
FIG. 5 is a simplified diagram illustrating the primary flux paths for both the permanent magnet ring and the top and bottom drive coils for the linear electromagnetic actuator of FIG. 1.

FIG. 5 is a simplified diagram illustrating the primary flux paths for both the permanent magnet rings and the drive coil for the preferred embodiment of the present invention. FIG. 5 shows the flux paths of FIG. 3 and FIG. 4 more clearly. Here, it can clearly be seen that the bias flux paths (500a) and (500b) are in opposite directions across gap (113) and gap (114) while the drive coil flux path (501) is in the same direction across the gaps.

Figure 6:
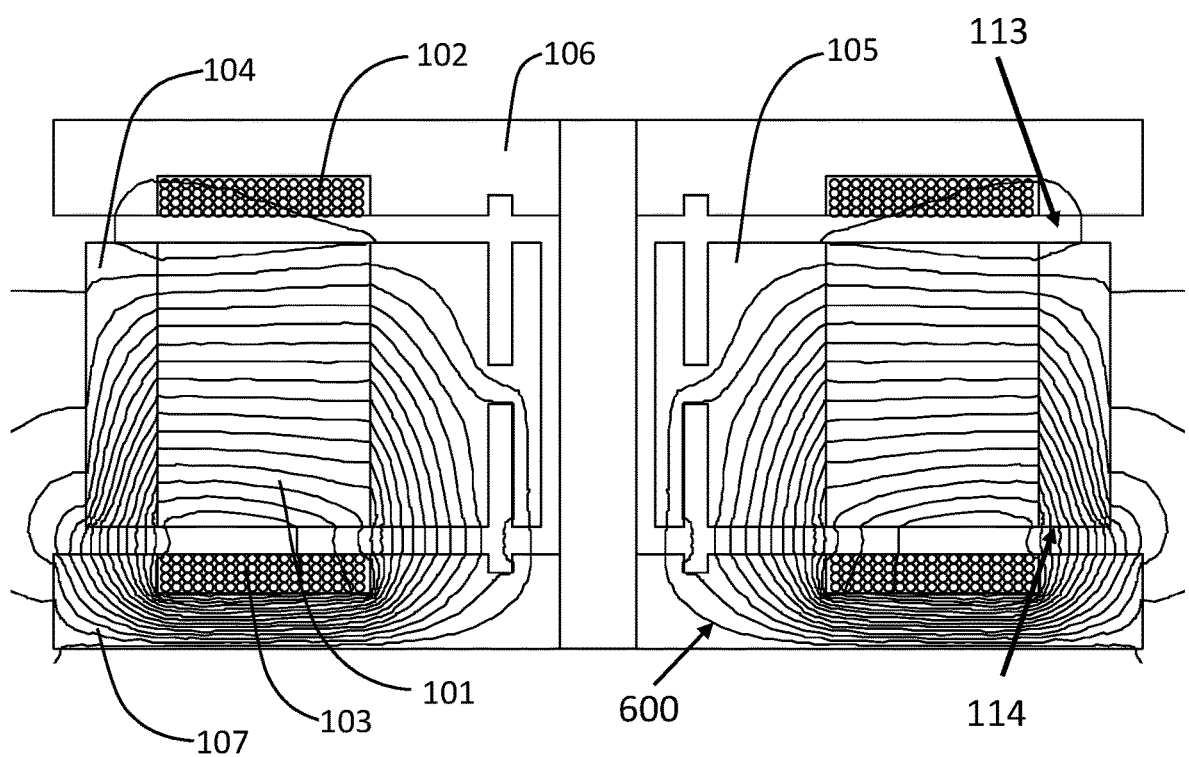
FIG. 6 shows the calculated magnetic flux lines from both the permanent magnet rings and the top and bottom drive coils for the linear electromagnetic actuator of FIG. 1.

FIG. 6 shows the calculated magnetic flux lines (600) simultaneously from permanent magnet ring (101) and from current through top drive coil (102) and bottom drive coil (103) when the inertial mass is in the neutral position. The combination of bias flux and coil flux tends to cancel in top gap (113) and add in bottom gap (114) because the bias flux is in opposite directions across gaps (113) and (114), while the coil flux is in the same direction. Thus, there is a net downward force on the inertial mass and an equal and opposite force upward on top stationary flux return (106) and bottom stationary flux return (107). The resulting force is linear with respect to current through drive coils (103) and (104). When current through drive coils (103, 104) is reversed, the combination of bias flux and coil flux cancels in bottom gap (114) and adds in top gap (113) and there is a net upward force on the inertial mass and an equal and opposite force downward on the top stationary flux return (106) and bottom stationary flux returns (107). Top drive coil (102) and bottom drive coil (103) may be connected in either series or parallel. A series connection is generally preferred because it ensures that the two coils have the same current, which provides the most linear force generation.

Figure 7:
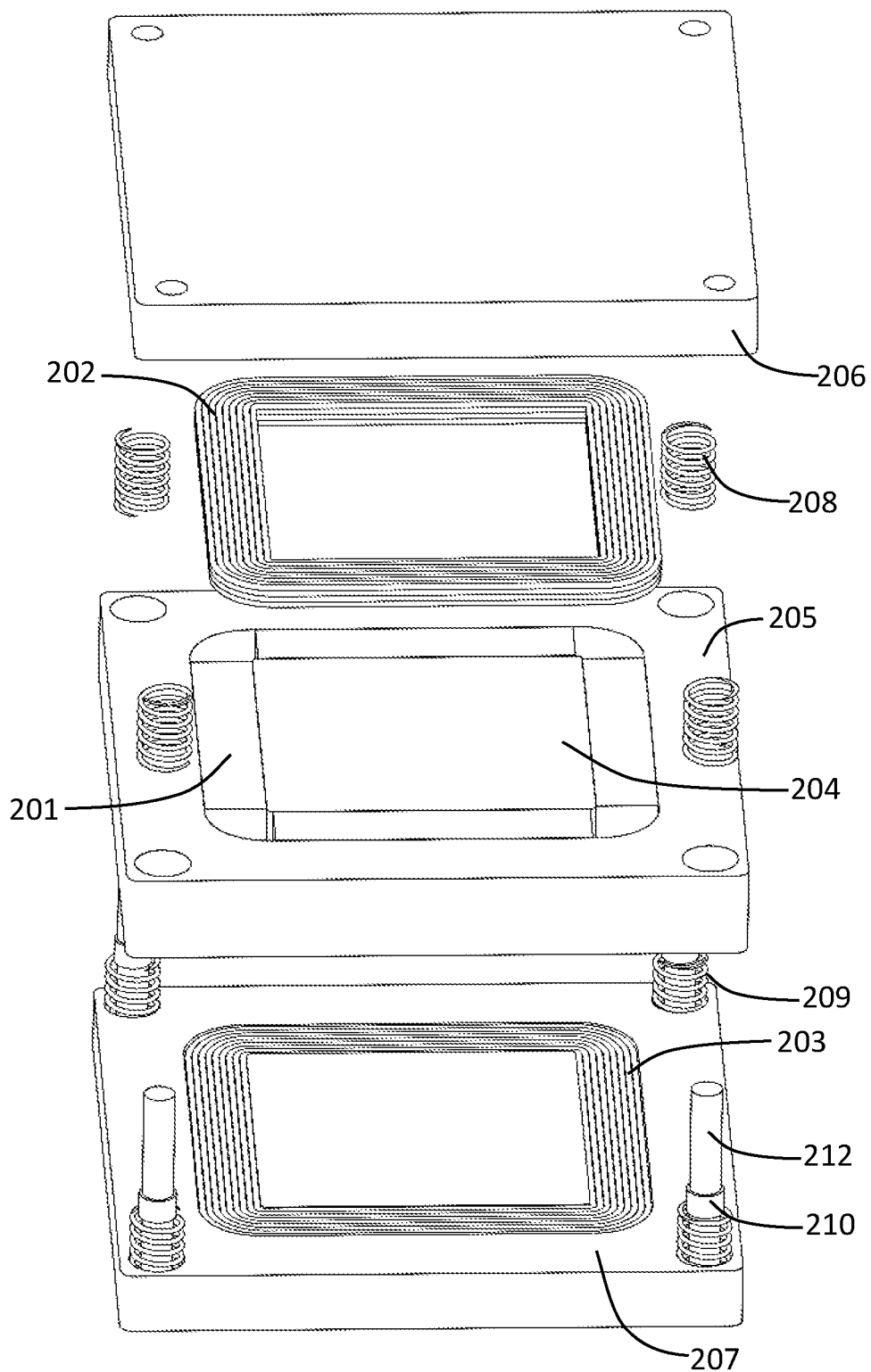
FIG. 7 is an exploded view of a linear electromagnetic actuator using rectangular magnets and corresponding rectangular coils, according to another embodiment of the invention.
Figure 8:
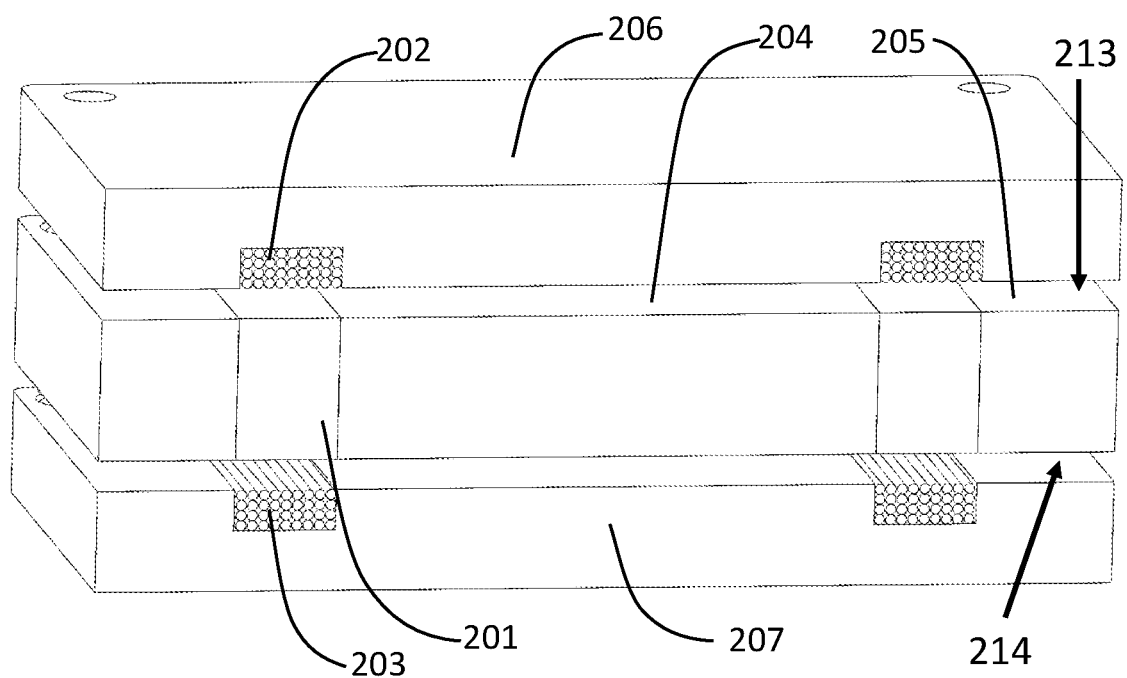
FIG. 8 is a cross sectional view of the linear electromagnetic actuator of FIG. 7.

FIG. 7 and FIG. 8 are two views of another embodiment of the invention.

As shown in the exploded view of a linear electromagnetic actuator with improved coil cooling of FIG. 7, the linear electromagnetic actuator has rectangular permanent magnets (201) between and in contact with movable inner flux return (204) and movable outer flux return (205). Four rectangular permanent magnets (201) are polarized through their thickness from movable outer flux return (205) to movable inner flux return (204), producing a net radial magnetic force. Permanent magnets (201), movable inner flux return (204), and movable outer flux return (205), are joined and move as a unit, forming the moveable inertial mass of the actuator.

A top stationary flux return (206) and a bottom stationary flux return (207) are separated from the conglomerate inertial mass by top air gap (213) and bottom air gap (214) (see FIG. 8). The inertial mass is slidably mounted by linear bearings (210) to stationary shafts (212), which connect the top stationary flux return (206) and the bottom stationary flux return (207). The inertial mass moves relative to top stationary flux return (206) and bottom stationary flux return (207), as allowed by the air gaps (213, 214). The movement of the inertial mass generates inertial forces. Top springs (208) are provided between the top stationary flux return (206) and outer flux return (205), and bottom springs (209) are provided between the bottom stationary flux return (207) and the outer flux return (205). Top springs (208) and bottom springs (209) provide a restoring and centering force to the inertial mass. Top drive coil (202) is embedded in top stationary flux return (206), and bottom drive coil (203) is embedded in bottom stationary flux return (207).

Rectangular magnets (201) are preferably made of a high strength magnet material, such as Neodymium magnets, preferably Neodymium Iron Boron (NdFeB) magnets. The inner flux return (204) and outer flux return (205) and top stationary flux return (206) and bottom stationary flux return (207) are preferably made of silicon steel to provide high permeability and low hysteresis. These components may also be composed of thin laminations to reduce eddy currents. The top springs (208) and bottom springs (209) and the stationary shafts (212) are preferably made of nonferrous material to prevent a flux path bypassing gap (213) and gap (214). Linear bearings (210) are preferably low friction linear ball bearings to prevent inertial force distortion due to friction. Top drive coil (202) and bottom drive coil (203) are preferably wound from insulated copper wire manufactured for coils, known as magnet wire.

It should be noted that the embodiment shown in FIGS. 7-8 merely changes the component shapes and arrangement from the cylindrical component shapes and arrangement of FIGS. 1-2, to rectangular component shapes and arrangement. The description of the flux paths and their interactions applies to both arrangements. Other shapes, such as triangular, hexagonal or octagonal, may also be used in accordance with the invention.

Figure 9:
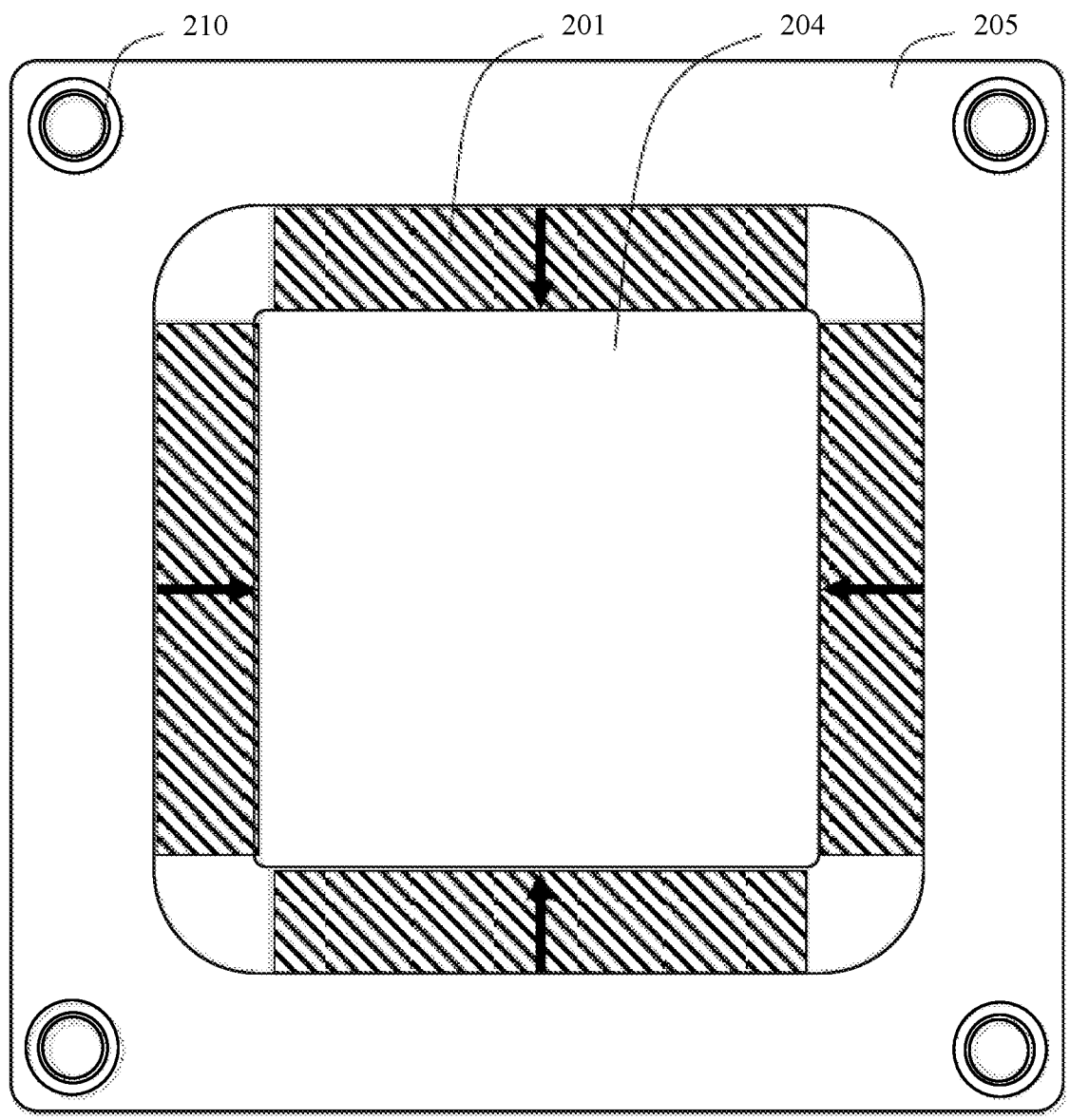
FIG. 9 is a top view of the magnet assembly of the linear electromagnetic actuator of FIG. 7.

FIG. 9 is a top view of magnet assembly illustrating the polarization direction of magnets (201). Each magnet (201) is polarized from outer flux conductor (205) towards the inner flux conductor (204), which it contacts. Also shown are linear bearings (210) which slide on stationary shafts (not shown).

Figure 10:
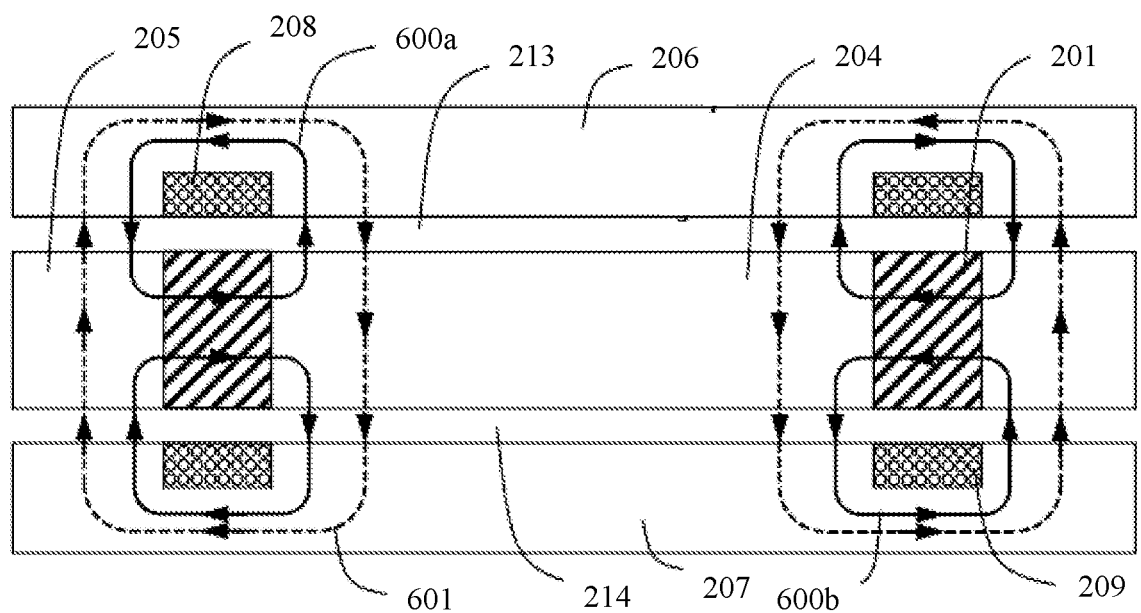
FIG. 10 is a simplified diagram illustrating the primary flux paths for a linear electromagnetic actuator of FIG. 7.

FIG. 10 is a simplified cross-sectional view of the linear electromagnetic actuator with improved coil cooling of FIG. 7, illustrating the primary flux paths. Flux paths (600a, 600b) in solid lines are from permanent magnets (201), while flux paths (601) in dashed lines are from current through upper and lower coils (208, 209). Permanent magnet flux (600a, 600b) flows from a permanent magnet (201) into an inner flux conductor (204), across upper gap (213) or lower gap (214), through upper or lower stationary flux returns (206, 207), back across upper gap (213) or lower gap (214) to outer flux conductor (205), and then back to permanent magnet (201) in a closed loop. Coil current flux (601) flows around the upper and lower coils (208, 209) in a complete loop from lower stationary flux return (207), across lower gap (214), through inner flux conductor (204), across upper gap (213), through upper stationary flux return (206), back across upper gap (213), through outer flux conductor (205), and back across lower gap (214) to lower stationary flux return (207).

It can be seen in FIG. 10 that permanent magnet flux (600a, 600b) and coil current flux (601) are in the same direction and add in lower gap (214) while they are in opposite directions and tend to cancel in upper gap (213). Thus, there is a net downward magnetic force on the magnet assembly, causing the assembly to move and generate inertial forces that are linear with current through drive coils (208, 209). When current through drive coils (208, 209) is reversed, the direction of coil current flux (601) also reverses and the combination of permanent magnet flux and coil flux cancels in lower gap (214) and adds in upper gap (213), producing a net upward force on the magnet assembly. Thus, inertial forces generated are both linear and reversible.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed is:

1. A linear electrodynamic actuator, comprising:
   a top stationary flux return;
   a top drive coil embedded in the top stationary flux return;
   a bottom stationary flux return;
   a bottom drive coil embedded in the bottom stationary flux return;
   a stationary shaft, with a top side and a bottom side, that connects the top stationary flux return to the bottom stationary flux return;
   a linear bearing provided on the stationary shaft; and
   a movable inertial mass slidably mounted by the linear bearing to the stationary shaft, between the top stationary flux return and the bottom stationary flux return,
   wherein
      a top air gap separates the top stationary flux return from the movable inertial mass, and
      a bottom air gap separates the bottom stationary flux return from the movable inertial mass, and
   wherein
      the movable inertial mass comprises:
      an inner flux conductor;
      an outer flux conductor; and
      polarized permanent magnets provided between and in contact with the inner flux conductor and the outer flux conductor, and
   wherein
      a first spring is provided between the top stationary flux return and the inner flux conductor, and
      a second spring is provided between the bottom stationary flux return and the inner flux conductor.

2. The linear electrodynamic actuator of claim 1, wherein a polarized permanent magnets is comprised of a circumferential array of high strength magnet segments.

3. The linear electrodynamic actuator of claim 1, wherein the inner flux conductor and the outer flux conductor comprise silicon steel.

4. The linear electrodynamic actuator of claim 1, wherein the top stationary flux return and bottom stationary flux return comprise silicon steel.

5. The linear electrodynamic actuator of claim 1, wherein the first spring between the top stationary flux return and the inner flux conductor, and the second spring between the bottom stationary flux return and the inner flux conductor are comprised of a nonferrous material.

6. The linear electrodynamic actuator of claim 1, wherein the linear bearing is a ball bearing.

7. The linear electrodynamic actuator of claim 1, wherein the top and bottom drive coils are wound from insulated copper wire.

8. The linear electrodynamic actuator of claim 1, wherein the top drive coil and the bottom drive coil are in series.

9. The linear electrodynamic actuator of claim 1, wherein the top drive coil and the bottom drive coil are in parallel.

10. The linear electrodynamic actuator of claim 1, wherein the top air gap and the bottom air gap accommodate axial motion of the movable inertial mass.

11. The linear electrodynamic actuator of claim 1, wherein magnetic flux, extending from the polarized permanent magnets, creates a bias flux loop through the outer flux conductor, across the top and bottom air gaps, through the top and bottom stationary flux returns, back across the first and second air gaps, through the inner flux conductor, and back to the polarized permanent magnets.

12. The linear electrodynamic actuator of claim 11, wherein the magnetic flux across the top and bottom air gaps provides a bias flux for operating the actuator.

13. The linear electrodynamic actuator of claim 11, wherein the bias flux is in opposite directions across the top and bottom air gaps.

14. The linear electrodynamic actuator of claim 1, wherein magnetic flux, extending from the top and bottom drive coils, creates a coil flux loop from the inner flux conductor across the top and bottom air gaps, through the top and bottom stationary flux returns, back across the gaps to the outer flux conductor, across the opposite gap and through the opposite stationary flux return, and then back to the inner flux conductor to complete a flux loop.

15. The linear electrodynamic actuator of claim 14, wherein the coil flux is the same direction across the top and bottom air gaps.

16. The linear electrodynamic actuator of claim 14, wherein the combination of bias flux and coil flux cancels in the top air gap and adds in the bottom air gap, creating a net force on the movable inertial mass and an equal and opposite force on the top and bottom stationary flux returns, which creates a resulting linear force with current through the drive coils in the opposite direction when the current through the drive coils is reversed.

17. The linear electrodynamic actuator of claim 1, wherein the polarized permanent magnets are arranged in a ring, and the inner and outer flux conductors are configured as cylinders.

18. The linear electrodynamic actuator of claim 1, wherein the polarized permanent magnets are arranged in a rectangle, and the inner and outer flux conductor are configured as rectangles.

19. The linear electrodynamic actuator of claim 1, wherein embedding the top and bottom drive coils in the top and bottom stationary flux returns provides heat transfer and improved coil cooling, due to direct transfer of coil heat to steel.

* * * * *